United States Patent Office 2,882,294
Patented Apr. 14, 1959

2,882,294

SUBSTITUTED PHOSPHONYLIDENE DIIMINO DIBENZOIC ACIDS AND POLYESTERS THEREFROM

John R. Caldwell and James C. Martin, Kingsport, Tenn., assignors to Eastman Kodak Company, Rochester, N.Y., a corporation of New Jersey No Drawing. Application March 12, 1956
Serial No. 570,677

5 Claims. (Cl. 260—471)

This invention relates to certain new phosphonylidene diimino dibenzoic acid compounds and to polyesters of improved fire resistance prepared therefrom. More particularly, the invention is concerned with the new 4,4′-(phenylphosphonylidenediimino) dibenzoic acid, 4,4′-(diethylaminophosphonylidenediimino)dibenzoic acid and esters thereof, and to polyesters prepared from such acids or esters by condensation with one or more glycols either alone or in admixture with one or more other bifunctional dicarboxylic acids.

There is a long standing need in the art for materials which can be used as plasticizers, coatings and treating agents which function also to impart fire resistant characteristics to many of the well known compositions. In addition, it is desirable to have materials available which are bifunctional in character and which can be incorporated as reactants in the formation of condensation polymers to give polymeric materials which can be spun into fibers or extruded into sheets having improved fire resistance coupled with good dyeability and other desirable chemical and mechanical properties.

It is accordingly an object of this invention to provide new and improved monomeric substituted phosphonylidenediimino dibenzoic acid compounds as defined herein suitable for use in monomeric form as plasticizers and the like and also suitable for preparing fire resistant condensation polymers. Another object of the invention is to provide the new compounds 4,4′-(phenylphosphonylidenediimino)dibenzoic acid, 4,4′-(diethylaminophosphonylidenediimino)dibenzoic acid and esters thereof such as the alkyl and aryl esters. Another object of the invention is to provide new and improved polymeric esters resulting from condensation of these new polymers with glycols, either alone or in admixture with other dicarboxylic acid reactants, to give compositions of improved fire resistance. Other objects will be apparent from the description and claims which follow.

These and other objects are attained by means of this invention wherein dichlorophenylphosphine oxide or dichlorodiethylaminophosphine oxide is reacted with p-aminobenzoic acid or an ester thereof in the presence of a hydrogen chloride acceptor, such as an organic base, to form the new compounds 4,4′-(phenylphosphonylidenediimino)dibenzoic acid, 4,4′-(diethylaminophosphonylidenediimino)dibenzoic acid, and the esters thereof such as the alkyl or aryl esters. It has been found that these two specific compounds or their esters have excellent utility in the manufacture of fireproof condensation polymers such as polyesters or polyamides. In addition, the esters of these two acids are also useful as plasticizers for polyvinyl chloride and cellulose plastics. The formation of the acids or esters embodying the invention is characterized by ease of operation and purity of the reaction product.

The preparation of the compounds embodying the invention, in monomeric form, is readily carried out by adding the dichlorophenylphosphine oxide or the dichlorodiethylaminophosphine oxide to the mixture of p-aminobenzoic acid or an ester thereof and the hydrogen chloride acceptor. The reaction proceeds by merely refluxing the mixture for 2–4 hours, whereupon the product is readily isolated and purified by recrystallization. The hydrogen chloride acceptor can be any of the well known organic bases which are sufficient to tie up the hydrogen chloride evolved by the reaction. The formation of the compounds of this invention is illustrated by the following equation:

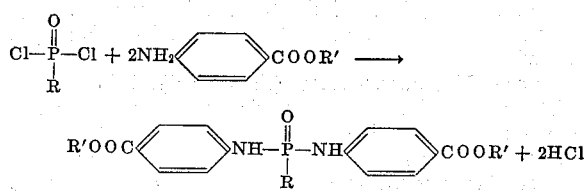

wherein R is a phenyl radical or a diethylamino radical and R′ is hydrogen or an alkyl or aryl group. Generally, the p-aminobenzoic acid esters are employed so as to give the corresponding monomeric ester as product since the esters are of greatest utility both as plasticizers and as bifunctional reactants in the preparation of polyesters and polyamides. The nature of the ester group does not affect the course of the reaction, and the R′ can be phenyl, substituted phenyl, or an alkyl group having a straight or branched chain and having as many as 18 or more carbon atoms as desired. In many cases, particularly when the esters are intended for use in polymer formation, the lower alkyl esters containing 1–6 and preferably 1–4 carbon atoms in the alkyl group are preferred since the alkyl group splits off during the course of the condensation. In accordance with usual terminology, the condensation polymers are spoken of as polymeric esters of the acid regardless of whether the free acid or an ester thereof is used initially in the condensation reaction.

The preparation of the monomeric compounds embodying the invention is illustrated by the following examples, it being understood that the free acids and any of the other esters can be prepared in exactly the same way merely by employing either free p-aminobenzoic acid or a different ester thereof as an initial reactant.

Example 1

29.3 g. of dichlorophenylphosphine oxide (0.15 mole) is added at room temperature with stirring to a solution of 50 g. ethyl p-aminobenzoate (0.3 mole) and 30.4 g. triethylamine (0.3 mole) in 150 ml. of chloroform. Some heat of reaction resulted. After the addition is complete, the reaction mixture is stirred at room temperature for one hour, then refluxed for 2 hours. A white solid precipitated. After cooling, the reaction solution is washed with water, dilute hydrochloric acid, water, dilute sodium bicarbonate solution and finally with water. This chloroform solution is dried with sodium sulfate and then evaporated on the steam bath. The residue was partially crystalline. When the residue is treated with 100 ml. of benzene, the gummy portion of the mixture dissolved leaving a white, crystalline solid. This solid is filtered off and dried. It weighed 28.4 g. After recrystallization from ethanol-water mixture, the 4,4′-(phenylphosphonylidenediimino)dibenzoic acid, diethyl ester has a melting point of 207–208° C. and the following analysis: Percent N (found)—6.11 (theoretical), 6.19. Percent P (found)— 6.89 (theoretical), 6.85.

Example 2

27.5 g. of dichlorodiethylaminophosphine oxide (0.145 mole) is added at room temperature with stirring to a solution of 48.0 g. ethyl p-aminobenzoate (0.29 mole)

and 30.4 g. triethylamine (0.3 mole) in 150 ml. chloroform. Some heat of reaction resulted. After the addition is complete, the reaction mixture is stirred at room temperature for one hour, then refluxed for 3 hours. A white solid precipitated. After cooling, the reaction solution is washed with water and then dried with sodium sulfate. Upon evaporation of this solution, a partially crystalline residue resulted. This material is treated with 150 ml. ethanol and the gummy material dissolved leaving a white, crystalline solid. This solid is filtered off and dried. It weighed 24.2 g. After recrystallization from methyl Cellosolve-water mixture, the 4,4'-(diethylaminophosphonylidenediimino)dibenzoic acid, diethyl ester has a melting point of 233–235° and the following analysis:

Percent N (found)—9.40 (theoretical), 9.40.

These and similar monomeric materials as defined herein can be used directly as flame retardant plasticizers for such materials as polyvinyl chloride, cellulose plastics and similar compositions wherein a plasticizer can be used.

A particular advantage of the bifunctional compounds embodying the invention is their ability to enter into condensation reactions with bifunctional reactants such as glycols or diamines. Thus, any of the compounds embodying this invention can be converted into polymeric esters of one or more glycols, preferably containing 2–10 carbon atoms, and it is immaterial whether the polymeric ester thus formed is prepared in the presence or absence of another dicarboxylic acid such as terephthalic acid, sulfonyldibenzoic acid or similar well known bifunctional dicarboxylic acid.

The preparation of the condensation polymers proceeds according to the well known methods of the art, and it is not deemed necessary to set out herein all of the details of condensation polymer practice which are applicable. The condensation proceeds in the usual way at elevated temperatures in the presence of an ester interchange catalyst, preferably with a heating period at reduced pressures to form superpolymers in accordance with the usual techniques.

The monomers embodying this invention can be condensed with one or more of the well known glycols, the glycols having 2–10 carbon atoms being preferred. These glycols can include either straight, branched chain, or cyclic glycols as desired and include such glycols as ethylene glycol, propylene glycol, 1,3-butanediol, 2,2-dimethylpropanediol, 1,6-hexanediol, 2-ethylhexanediol, 4,4'-cyclohexanedimethanol, and similar well known glycols. When one of the phosphonylidenediimino dibenzoic acid compounds of this invention is condensed with a glycol to form a polymeric ester in the absence of a second dicarboxylic component, the resulting polyesters are of relatively low molecular weight and are readily soluble in many of the common organic solvents. The fire retarding properties makes such materials highly useful for protective coatings having fire resistance as well as for treating agents or additives for films, fibers and the like. When the polymeric esters are for direct use as fibers or films, the reaction is carried out employing another dicarboxylic acid, preferably in ester form, in combination with the glycol or glycols and the compounds of this invention. The amount of the phosphonylidene dibenzoic acid compound can be varied over the entire range of concentrations but desirably is used in an amount of up to about a quarter of the total mole percent of dicarboxylic reactants.

The preparation of typical condensation polymers embodying the invention is illustrated by the following examples, it being understood that such examples are merely illustrative and not intended to limit the scope of the invention unless otherwise specifically indicated.

*Example 3*

One molecular proportion of 4,4'-(phenylphosphonylidenediimino)dibenzoic acid diethyl ester and two molecular proportions of 1,3-butanediol were stirred at 200–220° C. in the presence of 0.1% lead oxide and 0.05% calcium oxide. The ethyl alcohol formed by ester interchange was removed by distillation. After 2 hours, the temperature was raised to 240° C. and stirring was continued for 1 hour. A vacuum of 0.1 mm. was applied and stirring was continued for 30–40 minutes. The product was a viscous gum that was soluble in the lower alcohols, ketones, and chlorinated hydrocarbons. This low-molecular-weight polyester is useful as a fire-retardant. It can be added to films, fibers, protective coatings, etc., to reduce the rate of burning.

*Example 4*

As can be seen from Example 3, the 4,4'-(phenylphosphonylidenediimino)dibenzoic acid compounds give excellent fire retardant properties. Similarly improved results are obtained when 4,4'-(diethylaminophosphonylidenediimino)dibenzoic acid compounds are condensed with any of the glycols referred to herein. Thus, triethylene glycol was condensed with 4,4'-(diethylaminophosphonylidenediimino)dibenzoic acid diethyl ester as described in the preceding example. Again, a low molecular weight polyester was obtained which also was useful as a fire retardant.

*Example 5*

Four molecular proportions of dimethyl terephthalate, one molecular proportion of 4,4'-(phenylphosphonylidenediimino)dibenzoic acid dimethyl ester, and 10 molecular proportions of ethylene glycol were placed in a reaction vessel equipped with a stirrer, a distillation column, and an inlet for purified nitrogen. Lead oxide (0.1%) and magnesium metal (0.1%) were added as catalysts. The mixture was stirred at 190–200° C. and methyl alcohol was distilled through the column. After the distillation of alcohol had practically stopped, the temperature was raised to 260–270° C. and held for 30 minutes. A vacuum of 0.1 mm. was applied and stirring was continued for 3 hours. The product gave strong, elastic fibers when extruded through a spinneret. The fibers had a very slow burning rate and were difficult to ignite.

*Example 6*

The nature of the second dicarboxylic acid component employed in forming the polymeric esters of the compounds embodying this invention with a glycol is subject to variation since any of the dicarboxylic acid reactants known to the art, whether aliphatic or aromatic, can be used. Thus, a polyester was made as in Example 5 from 0.75 molecular proportion of 4,4'-sulfonyldibenzoic acid, 0.25 molecular proportion of 4,4'-(diethylaminophosphonylidenediimino)dibenzoic acid and an excess of pentanediol. The resulting polyester was readily spinnable into fibers having a very slow burning rate and characterized by being difficult to ignite.

Similar results are obtained employing the compounds of this invention as monomeric reactants together with any of the glycols and dicarboxylic acids known to the art. This invention thus provides a method whereby fire resistance is imparted to well known polymeric compositions without destroying the other desirable properties known to the art. In addition, the invention provides monomeric acids and esters which can be used directly as plasticizers, treating agents and the like for imparting a flame resistance.

Although the invention has been described in detail with particular reference to certain preferred embodiments thereof, variations and modifications can be effected within the spirit and scope of the invention as described hereinabove and as defined in the appended claims.

We claim:
1. A lower alkyl diester of a compound of the formula

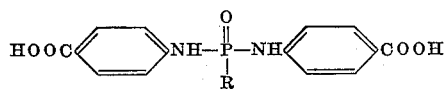

wherein R is selected from the group consisting of phenyl and diethylamino radicals.

2. A lower alkyl diester of the compound

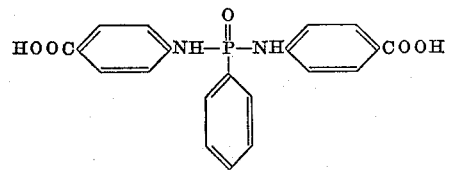

3. A lower alkyl diester of the compound

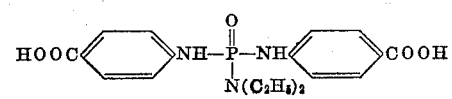

4. The ethyl diester of the compound of the formula

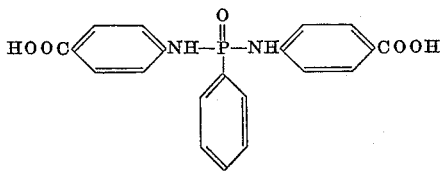

5. The ethyl diester of the compound of the formula

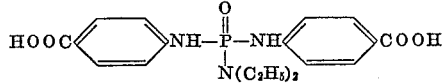

References Cited in the file of this patent
UNITED STATES PATENTS

| | | |
|---|---|---|
| 2,101,323 | Salzberg | Dec. 7, 1937 |
| 2,286,788 | Curtis | June 16, 1942 |
| 2,306,095 | Valjanec | Dec. 22, 1942 |
| 2,532,498 | Hoppens | Dec. 5, 1950 |
| 2,624,757 | Bersworth | Jan. 6, 1953 |
| 2,646,420 | Morgan | July 21, 1953 |